(12) United States Patent
Shigematsu et al.

(10) Patent No.: US 7,061,205 B2
(45) Date of Patent: Jun. 13, 2006

(54) METHOD FOR OPERATING REDOX FLOW BATTERY SYSTEM

(75) Inventors: Toshio Shigematsu, Osaka (JP); Takahiro Kumamoto, Osaka (JP); Hiroshige Deguchi, Osaka (JP); Nobuyuki Tokuda, Osaka (JP)

(73) Assignees: Sumitomo Electric Industries, Ltd., Osaka (JP); The Kansai Electric Power Co., Inc., Osaka (JP)

( * ) Notice: Subject to any disclaimer, the term of this patent is extended or adjusted under 35 U.S.C. 154(b) by 0 days.

(21) Appl. No.: 10/512,273

(22) PCT Filed: Apr. 21, 2003

(86) PCT No.: PCT/JP03/05058

§ 371 (c)(1),
(2), (4) Date: Oct. 22, 2004

(87) PCT Pub. No.: WO03/092109

PCT Pub. Date: Nov. 6, 2003

(65) Prior Publication Data

US 2005/0147871 A1     Jul. 7, 2005

(30) Foreign Application Priority Data

Apr. 23, 2002   (JP) .............................. 2002-120162

(51) Int. Cl.
*H01M 10/44*   (2006.01)

(52) U.S. Cl. ...................................................... 320/101

(58) Field of Classification Search ................ 320/101; 429/199, 15, 200, 202, 204, 21; 363/146; 315/111.81; 307/85; 290/44; 60/274; 702/194; 714/704

See application file for complete search history.

(56) References Cited

U.S. PATENT DOCUMENTS 3,506,813 A * 4/1970 Trimble ...................... 702/194

(Continued)

FOREIGN PATENT DOCUMENTS

JP        61-218076       9/1986

(Continued)

*Primary Examiner*—Pia Tibbits
(74) *Attorney, Agent, or Firm*—McDermott Will & Emery LLP

(57) ABSTRACT

An operating method of a redox flow battery system that can provide a stabilized output to a system from a redox flow battery system annexed to a wind power generator, to produce an improved battery efficiency. The redox flow battery system comprises the wind power generator 10, a redox flow battery 30 annexed to the wind power generator, and an AC/DC converter 40 connected to the redox flow battery. In the operating method, an output of the wind power generator within a certain period of time in the past is subjected to a first averaging process; a present output value of the wind power generator is subtracted from the resulting value of the first averaging process, from which an input/output command value to the AC/DC converter 40 is determined; the input/output command value is subjected to a variation computing process to find variation without any consideration of a sign of the input/output command value; the resulting value obtained by the variation computing process is further subjected to a second averaging process, and an output command value for a pump P to circulate electrolytic solution of the redox flow battery is determined based on the result of the second averaging process.

6 Claims, 6 Drawing Sheets

U.S. PATENT DOCUMENTS

| | | | | |
|---|---|---|---|---|
| 4,418,287 | A | * | 11/1983 | Syverson .................. 290/44 |
| 4,814,241 | A | * | 3/1989 | Nagashima et al. ........ 429/199 |
| 5,225,712 | A | * | 7/1993 | Erdman .................... 290/44 |
| 5,592,815 | A | * | 1/1997 | Jelden et al. ............. 60/274 |
| 5,708,665 | A | * | 1/1998 | Luthi et al. .............. 714/704 |
| 5,977,659 | A | * | 11/1999 | Takehara et al. .......... 307/85 |
| 6,465,965 | B1 | * | 10/2002 | Nelson ................... 315/111.81 |
| 6,560,131 | B1 | * | 5/2003 | vonBrethorst .............. 363/146 |

FOREIGN PATENT DOCUMENTS

| | | |
|---|---|---|
| JP | 4-4568 | 1/1992 |
| JP | 4-12464 | 1/1992 |
| JP | 10-269308 | 10/1998 |
| JP | 2001-43883 | 2/2001 |
| JP | 2001-339995 | 12/2001 |
| WO | WO-3092110 | * 11/2003 |

* cited by examiner

METHOD FOR OPERATING REDOX FLOW BATTERY SYSTEM

TECHNICAL FIELD

The present invention relates to an operating method of a redox flow battery system including a wind power generator. Particularly, the present invention relates to an operating method of a redox flow battery system that can provide a stabilized output of the wind power generator to improve the battery efficiency of the redox flow battery.

BACKGROUND ART

In recent years, wind power generators have been used increasingly. The wind power generator which generates electric power through the use of natural wind is a favorable generator in that it has very little environmental effect. On the other hand, since the wind power generator uses uncertain natural wind as its motive energy, the output also depends on the uncertain wind, leading naturally to an unstable output. In order to stabilize the unstable output, consideration is being made of combination of the wind power generator with a storage battery.

However, it is still hard for the wind power generator combined with the storage battery to achieve the stabilization of the output to a system side to a satisfactory extent. Further, such a combination is undesirable in the aspect of system efficiency as well.

It is common that a threshold is preset so that when the output of the wind power generator exceeds the threshold, the storage battery is charged with the surplus electricity, while on the other hand, when the output of the wind power generation is less than the threshold, the shortage is supplemented by discharging electricity from the storage battery. However, the actual output of the wind power generator varies so widely that the storage battery is forced to recharge and discharge irregularly and unpredictably, thus making it hard to achieve the stabilization of the output to the system side to a satisfactory extent.

Take the redox flow battery combined with the wind power generator for instance: it is common that the redox flow battery prepared has a rated output equivalent to a rated output of the wind power generator. However, the output of the wind power generator varies irregularly in the order of from seconds to minutes, so that it often amounts to tens of percents of the rated output on an average. Thus, although the output to the battery to be recharged and discharged reaches the rating at a peak value, it amounts to tens of percents of the rated output on an average. The redox flow battery involves a power loss resulting from a pumping operation for circulating electrolytic solution, suffering from the disadvantage that when the pump is operated at a regular flow rate all the time, the power loss increases, leading to reduction of system efficiency.

Accordingly, it is a primary object of the present invention to provide an operating method of a redox flow battery system that can provide a stabilized output to a system from a redox flow battery system annexed to the wind power generator, to produce an improved battery efficiency.

DISCLOSURE OF THE INVENTION

According to the present invention, the redox flow battery is combined with the wind power generator; an output of the wind power generator is subjected to an averaging process; and an output of a pump to circulate electrolytic solution is adjusted based on the result of the averaging process, whereby the object above is accomplished.

The present invention provides a novel operating method of a redox flow battery system comprising a wind power generator, a tedox flow battery annexed to the wind power generator, and an AC/DC converter connected to the redox flow battery. The operating method of the present invention is characterized in that an output of the wind power generator within a certain period of time in the past is subjected to a first averaging process; a present output value of the wind power generator is subtracted from the value resulting from the first averaging process and an input/output command value to the AC/DC converter is determined from the resulting value; the input/output command value is subjected to a variation computing process to find variation without any consideration of a sign of the input/output command value; the value resulting from the variation computing process is further subjected to a second averaging process; and an output command value for a pump to circulate electrolytic solution of the redox flow battery is determined based on the value resulting from the second averaging process.

The output to the system can be stabilized by averaging the output of the wind power generator within a certain period of time in the past to determine the input/output command value to the AC/DC converter.

Also, since the redox flow battery is operated with an optimum fluid volume of electrolytic solution in response to the momentarily varying input/output command value to the AC/DC converter, an unnecessary pumping power can be cut to improve the total energy efficiency of the battery system. The output command value of the pump can be controlled by a variety of methods, including, for example, controlling the rotation frequency of the pump and the number of pumps to be operated.

It is preferable that the first averaging process or the second averaging process is a moving average operation or a low-pass filter operation.

An explanatory view of the averaging processing method is shown in FIG. 6.

The moving average operation is carried out using the following equation (1).

$$Y(n)=Y(n-1)+\{X(n)-X(n-N)\}/N \qquad \text{Eq(1)}$$

Y(n): Presently averaged output value
Y(n−1): Averaged output value before 1 sampling
X(n): Presently averaged input value (Present output value of the wind power generator)
X(n−N): Averaged input value before N samplings (Output value of the wind power generator before N samplings)
N: Number of samples The LPF (low-pass filter) operation is carried out using the following equation (2).

$$Y(n)=Y(n-1)+\{X(n)-Y(n-1)\}/N \qquad \text{Eq(1)}$$

The variation computing process include (1) taking an absolute value of the input/output command value to the AC/DC converter, (2) taking a square value of the input/output command value to the AC/DC converter, and (3) taking a square root of a square value of the input/output command value to the AC/DC converter. In other words, letting the input/output command value to the AC/DC converter be represented as Z(t), the variation is determined by taking the following values:

Absolute value . . . $|Z(t)|$
Square value . . . $\{Z(t)\}^2$
RMS value (root-mean-square value) . . . $\sqrt{\{Z(t)\}^2}$

BEST MODE FOR CARRYING OUT THE INVENTION

Figure 1:
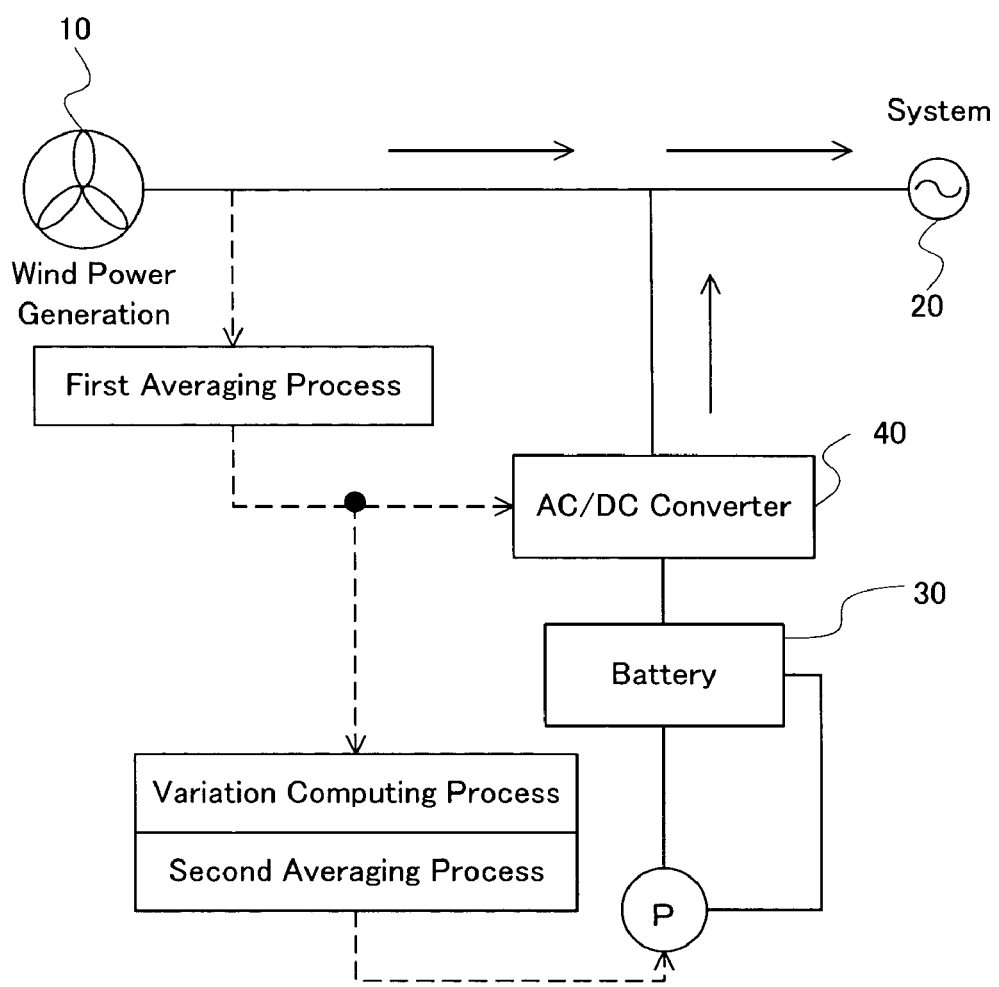
FIG. 1 is a schematic illustration showing a redox flow battery system to which an operating method of the present invention is applied.
Figure 2:
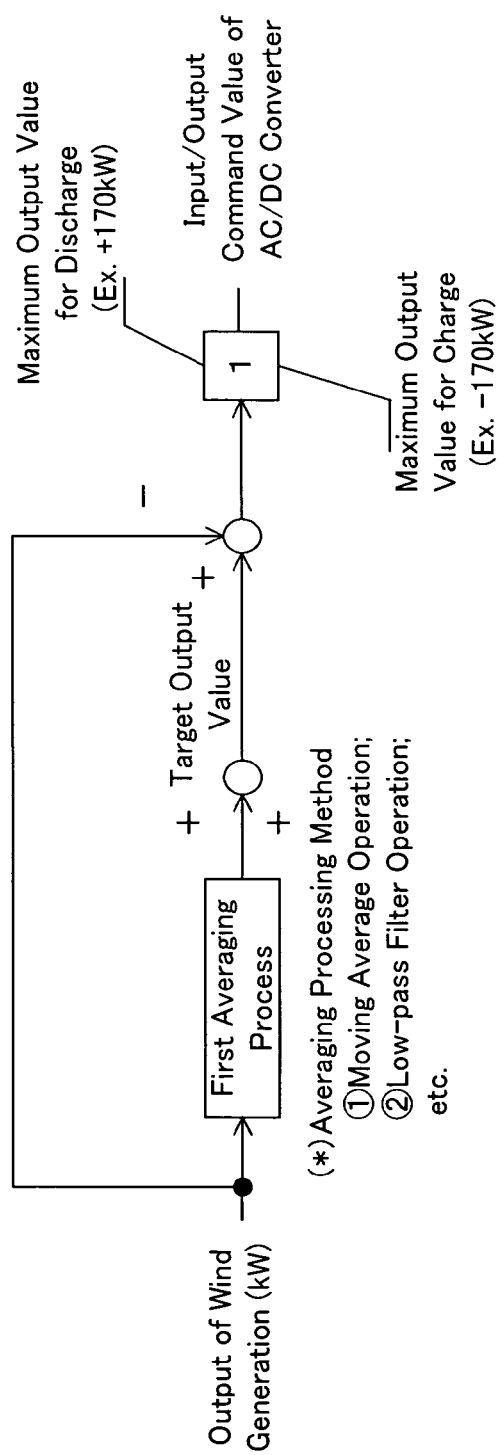
FIG. 2 is a schematic illustration showing a preliminary processing of the redox flow battery system to which the operating method of the present invention is applied.
Figure 3:
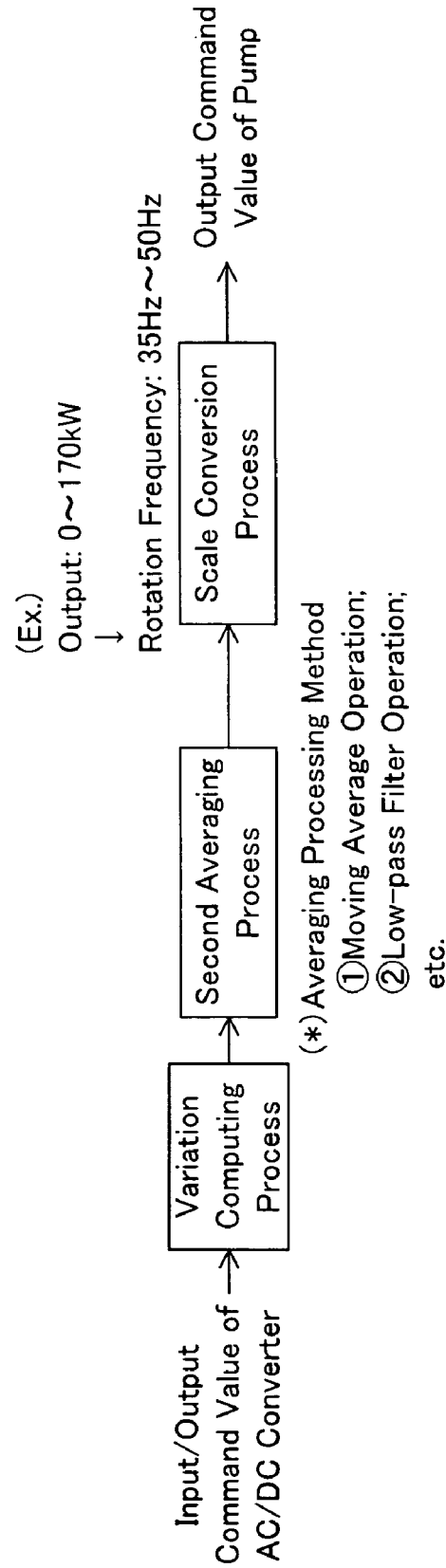
FIG. 3 is a schematic illustration showing a subsequent processing of the redox flow battery system to which the operating method of the present invention is applied.

In the following, an embodiment of the present invention is described. FIG. 1 is a schematic illustration showing a redox flow battery system to which an operating method of the present invention is applied. FIG. 2 is an illustration of a preliminary processing of the same method. FIG. 3 is an illustration of a subsequent processing of the same method.

This system comprises a wind power generator 10, a load-side system 20 to which electric power of the wind power generator 10 is supplied, and a redox flow battery 30 connected between the wind power generation 10 and the system through an AC/DC converter 40. Positive electrolyte and negative electrolyte are circulated in the battery 30 and fed to a positive electrode and a negative electrode, respectively, by a pump P.

The redox flow battery 30 has a cell structure disclosed in JP Laid-open (Unexamined) Patent Publications No. Hei 4-4568 and No. 2001-43883, for example. In this example, the cell structure is in the form of a cell stack with a number of cells laminated in layers.

The output of the wind power generation is subjected to a first averaging process. Specifically, the outputs of the wind power generation are monitored at a constant sampling interval, and the output values obtained at a specified time constant are computed, using low-pass filter operation. Then, the output value obtained by the averaging process is subtracted from a present output value of the wind power generator, and the resulting value is used as input/output command value to the AC/DC converter.

Then, the input/output command value is subjected to a variation computing process to find variation without any consideration of a sign of the input/output command value. An absolute value of the input/output command value is taken here as the variation (an absolute value processing).

Figure 4:
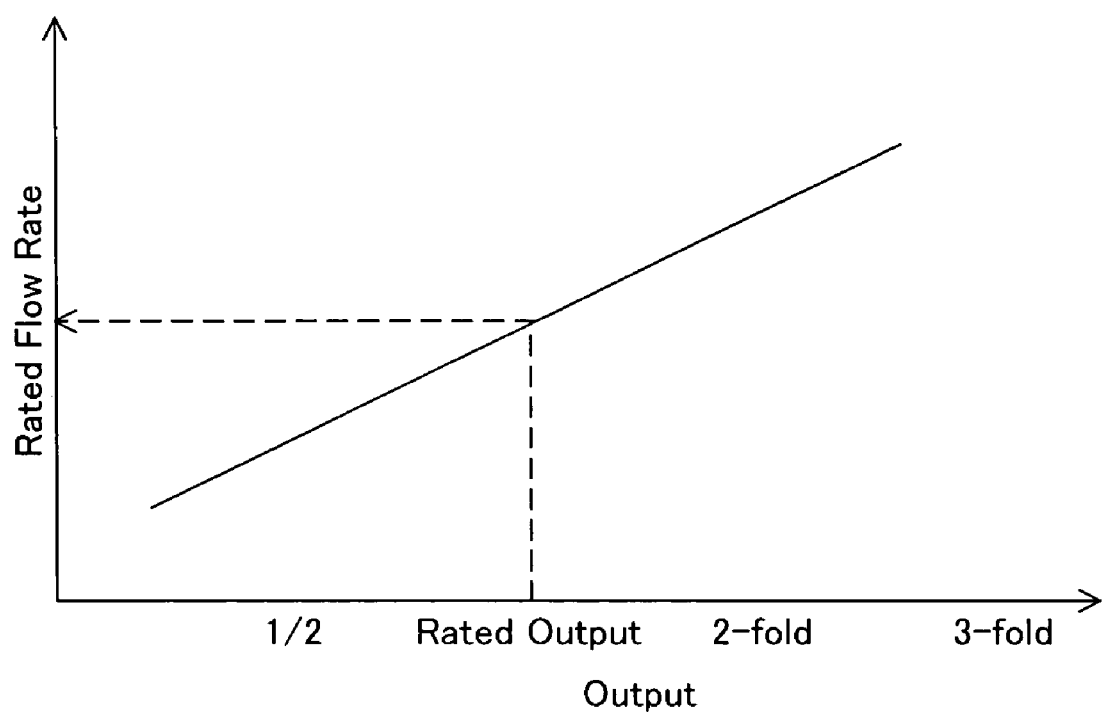
FIG. 4 is a graph showing a relation between an output of an AC/DC converter and a flow rate of a pump.

Sequentially, the absolute value of the input/output command value is further subjected to a second averaging process at a specified time constant. A moving average process is carried out here as the second averaging process. It is the reason why the second averaging process is carried out that since the input/output command value varies irregularly in the order of from a few seconds to a few minutes, it cannot be used practically for controlling the pump requiring the response time in the order of a few seconds. For example, the pump is controlled with reference to a proportionality relation between an output and a necessary flow rate, as shown in FIG. 4. To be more specific, the absolute value of the input/output command value (which is taken here to be 0–170 kW) is proportional to rotation frequency of the pump (e.g. 35–50 Hz), so that the rotation frequency of the pump is determined based on the absolute value of the input/output command value.

(Test Sample)

A wind power generator of a rated output of AC275 kW and a redox flow battery of time capacity of AC170 kW×6 hrs. are used. An output value is computed at the time constant of 60 sec., using the low-pass filter operation (the first averaging process), and the resulting value is used as the input/output command value to the AC/DC converter.

Then, an absolute value of the input/output command value is taken and the resulting absolute value is computed at the time constant of 60 sec. using the moving average operation (the second averaging process). Further, the resulting averaged value is converted to rotation frequency of the pump from the correlation between the absolute value of the input/output command value and the rotation frequency of the pump.

Figure 5:
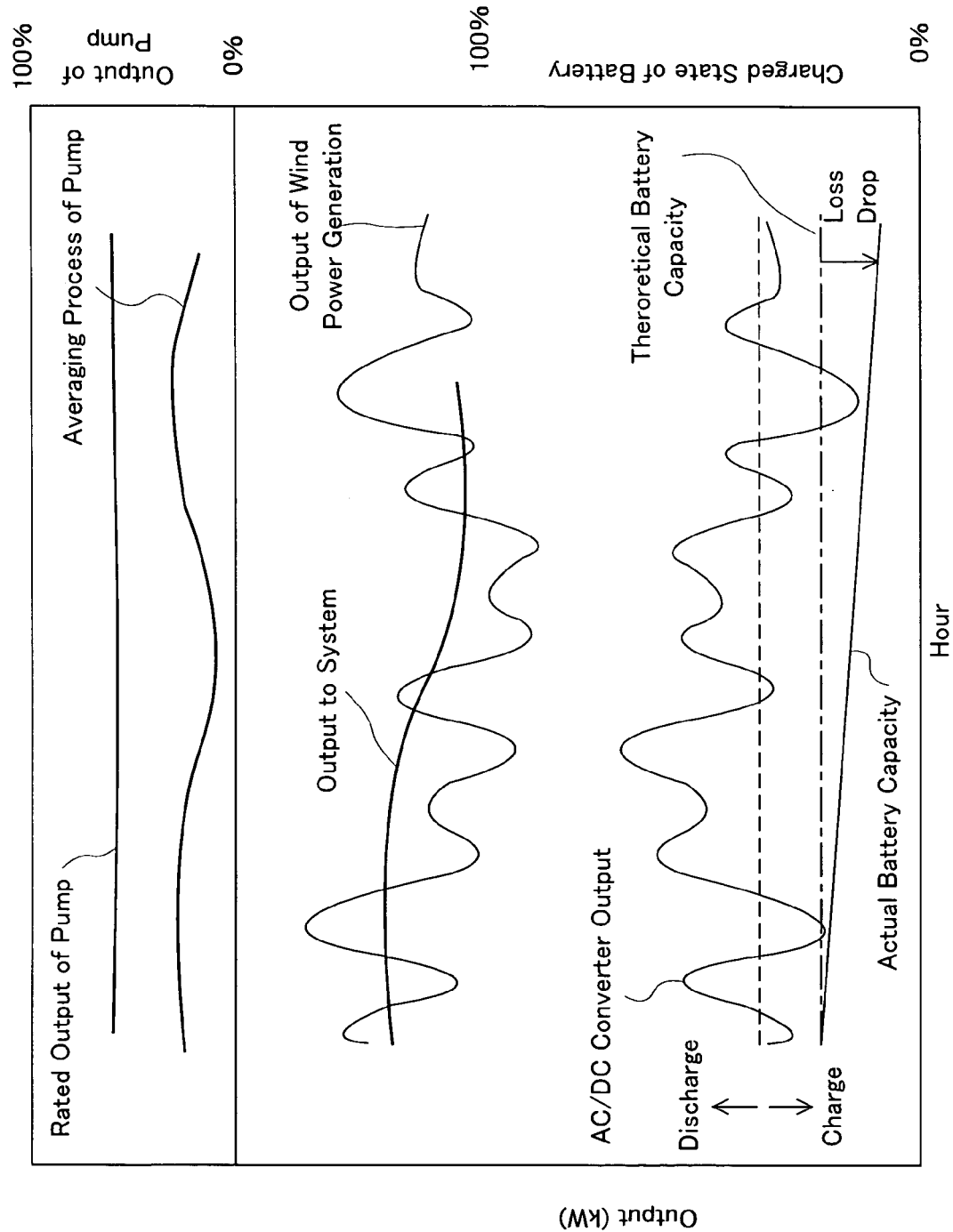
FIG. 5 is a graph showing a relation between the time and the output when the redox flow battery system is operated by the method of the invention.
Figure 6:
FIG. 6 is an explanatory view showing an averaging processing method.

The output of the wind power generation, the output of the AC/DC converter (that of the redox flow battery), the output to the system, and the charged state of the battery in the test sampling are shown in the graph of FIG. 5. In the output of the AC/DC converter, positive indicates an electrical discharge and negative indicates an electrical charge. As obvious from this graph, the output of the wind power generation varies so widely that the output of the AC/DC converter is provided in such a relation as to be traded off with the output of the wind power generator. It is also found therefrom that the output to the system can be smoothed by the first averaging process.

When the pump is driven at a constant flow rate corresponding to the rated output, the output of the pump is large. In contrast to this, when the output of the pump is made to correspond in value to the input/output command value of the AC/DC converter (the averaging process of the pump) using the second averaging process, the output of the pump can be reduced significantly, to produce improved battery efficiencies. While the pump was driven at a constant flow rate corresponding to the rated output, the battery efficiency was not more than 50%, while on the other hand, while the pump was driven by the method of the present invention, the battery efficiency was not less than 60%.

CAPABILITIES OF EXPLOITATION IN INDUSTRY

As explained above, according to the operating method of the present invention, the output of the wind power generator is subjected to the averaging process so that the output to the system can be stabilized.

Also, the operation of the pump is determined in response to the input/output command value of the AC/DC converter as well as the value obtained by the averaging process, to thereby produce improved battery efficiency.

The invention claimed is:

1. An operating method of a redox flow battery system comprising a wind power generator, a redox flow battery annexed to the wind power generator, and an AC/DC converter connected to the redox flow battery, wherein:

an output of the wind power generator within a certain period of time in the past is subjected to a first averaging process, a present output value of the wind power generator is subtracted from the output value obtained by the first averaging process, and an input/output command value to the AC/DC converter is determined from the resulting value, the input/output command value is subjected to a variation computing process to find variation without any consideration of a sign of the input/output command value, the resulting value obtained by the variation computing process is further subjected to a second averaging process, and an output command value for a pump to circulate electrolytic solution of the redox flow battery is determined based on the result of the second averaging process.

2. The operating method of a redox flow battery system according to claim 1, wherein the first averaging process or the second averaging process is a moving average operation.

3. The operating method of a redox flow battery system according to claim 1, wherein the first averaging process or the second averaging process is a low-pass filter operation.

4. The operating method of a redox flow battery system according to claim 1, wherein the variation computing process takes an absolute value of the input/output command value to the AC/DC converter.

5. The operating method of a redox flow battery system according to claim 1, wherein the variation computing process takes a square value of the input/output command value to the AC/DC converter.

6. The operating method of a redox flow battery system according to claim 1, wherein the variation computing process takes a square root of a square value of the input/output command value to the AC/DC converter.

* * * * *